Aug. 17, 1926. 1,596,615
C. J. G. MALMBERG ET AL
METHOD AND APPARATUS FOR THE RAPID DETERMINATION OF THE PERCENTAGE
OF CARBON IN IRON AND STEEL
Filed Feb. 5, 1921 3 Sheets-Sheet 1
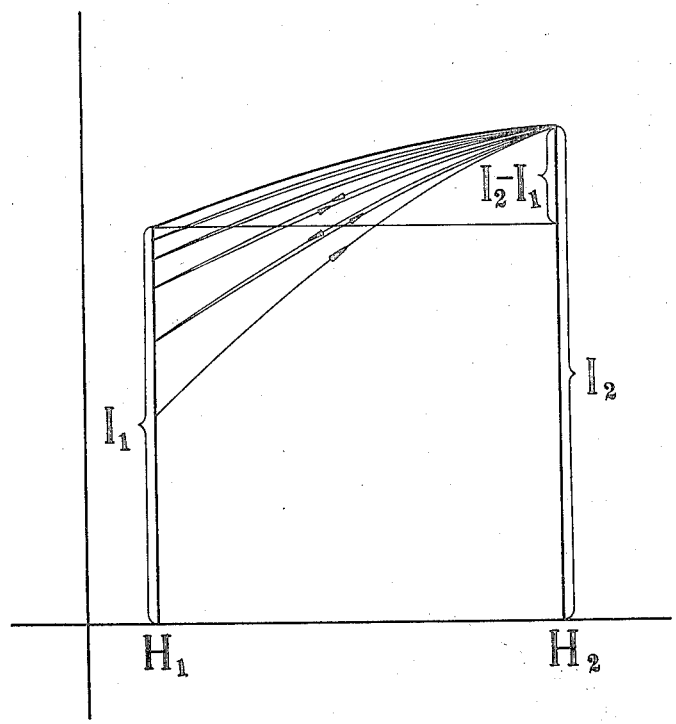
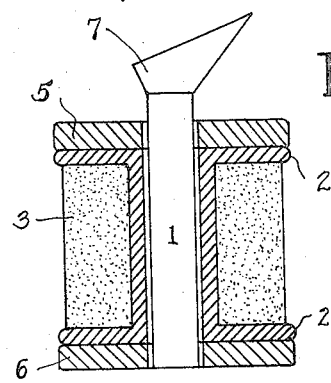
INVENTORS;
Carl J. G. Malmberg
Johan G. Holmström
By Wm Wallace White
ATTY Aug. 17, 1926.  1,596,615
C. J. G. MALMBERG ET AL
METHOD AND APPARATUS FOR THE RAPID DETERMINATION OF THE PERCENTAGE
OF CARBON IN IRON AND STEEL
Filed Feb. 5, 1921    3 Sheets-Sheet 3

Patented Aug. 17, 1926.

1,596,615

UNITED STATES PATENT OFFICE.

CARL JOHAN GUNNAR MALMBERG, OF SURAHAMMAR, AND JOHAN GUNNAR HOLMSTRÖM, OF SALTSJO-STORANGEN, SWEDEN.

METHOD AND APPARATUS FOR THE RAPID DETERMINATION OF THE PERCENTAGE OF CARBON IN IRON AND STEEL.

Application filed February 5, 1921, Serial No. 442,895, and in Sweden December 22, 1917.

As generally known the presence of impurities in iron, especially carbon, gives the iron different mechanical as well as different magnetic and electrical properties. The present invention relates to a method of and apparatus for determining the percentage of carbon in iron specimens, based upon a certain easily measurable magnetic property. It is of very great importance for practical reasons to be able to make this determination of the percentage of carbon rapidly and reliably, so that it may be made, for instance in an open-hearth furnace during the process.

The relation between the magnetic properties of iron and the percentage of carbon therein is generally known. Experiments regarding the relation between the magnetic flux and the percentage in carbon of different kinds of steel as well as the changes of the coercive force and the remanence have been made and their results published, but the methods by means of which the percentage of carbon may be inferred from the magnetic properties, are very troublesome, impractical and unreliable. The best method would be to establish the complete magnetic cycle of the specimen and to try to make conclusions on that basis, but the measuring is then very troublesome and lengthy and results are impaired by numerous incidental circumstances, which render it very difficult to make any conclusions as to the composition of the specimen. Another known method is that of forging the specimen in the shape of a ring, winding it with insulated copper wire and then by means of the ballistic method determining the density of the magnetic flux at a certain magnetomotive force or to establish the complete hysteresis loop. In using this method several disturbing factors have to be eliminated, but such a method cannot be used in practice as it is too lengthy. To use specimens and close the magnetic circuit by means of yokes (Koepsel's apparatus and others) for determining the magnetic flux density or for establishing the magnetization curve, may of course be done for making comparison of the magnetic properties of different kinds of iron, but such a method is very unreliable for making any conclusions as to the percentage of carbon of the specimen.

The absolute value of the magnetic flux density is dependent on the closing of the magnetic circuit; different specimens give different magnetic leakages at the same magnetomotive force and the same magnetic circuit, and so on. It is evident that these circumstances render a determination of the percentage of carbon impossible, as it can be proved that when the pressure of the yoke on the specimen is varied, different values of the flux at the same magnetomotive force and under the same conditions are obtained.

There are more important reasons also why an exact determination of the percentage of carbon of an iron specimen cannot be made on the basis of the flux density measured against a certain magnetomotive force.

In the course of the assiduous experiments which have resulted in the present invention, it has been found that it is quite another magnetic property of an iron specimen that is in an exact relation to its percentage of carbon.

It has been found that when an iron specimen is subjected to the influence of a magnetic field, which is varied several times (to and fro) between two values, the definite difference of the magnetic flux indicates the percentage of carbon of the specimen.

The specimen must be magnetized and demagnetized repeatedly between the two chosen values before the difference of the magnetic flux is measured, as it has been found that said difference is constant only after several magnetizations and demagnetizations.

Figure 1 of the annexed drawing shows the mere theoretical fact.

Fig. 3 is a sectional view of the device for magnetizing and de-magnetizing the specimen.

Figure 2:
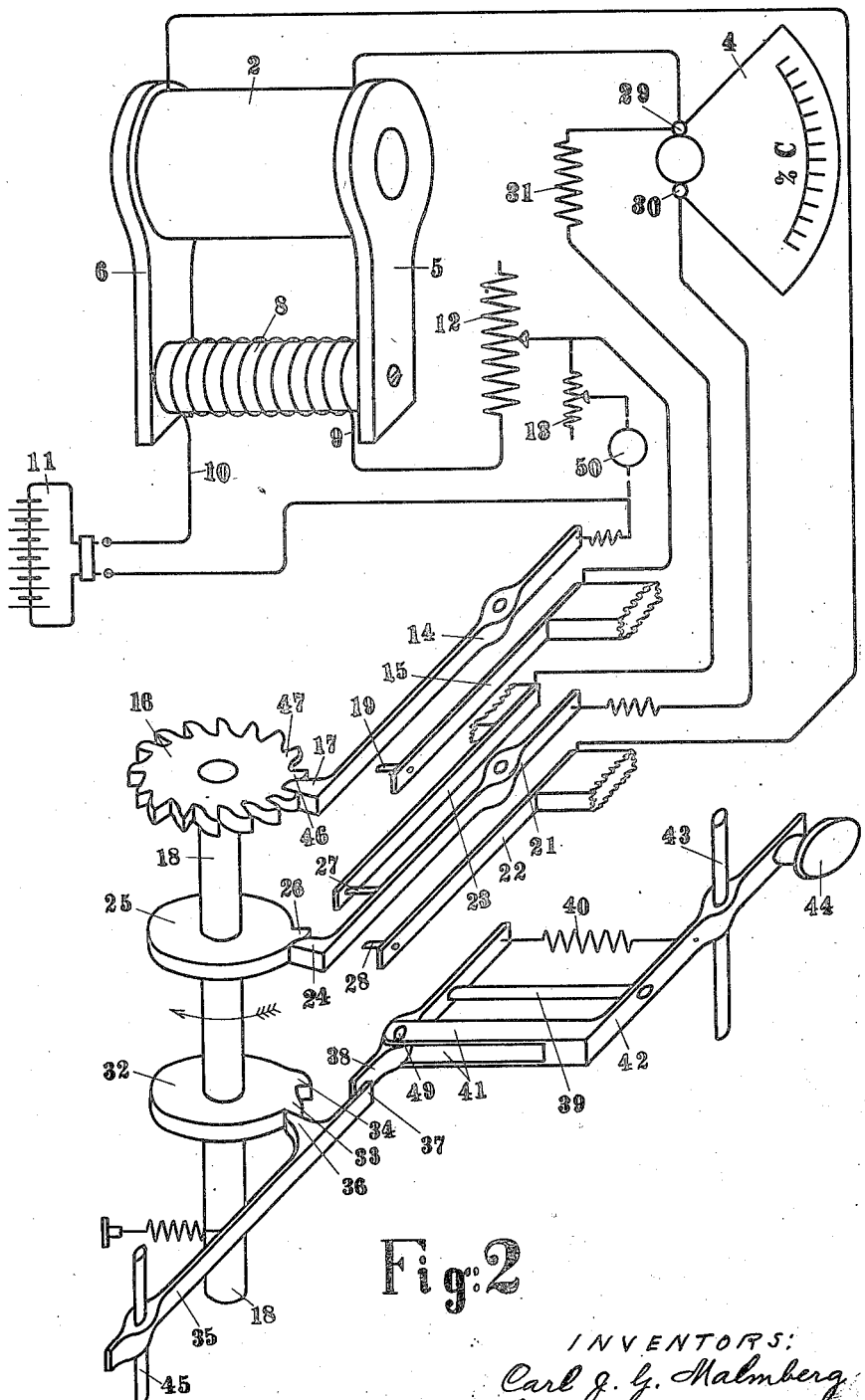
Fig. 2 is a detail view of the apparatus.

The magnetization of the specimen is assumed to be varied between the values $H_1$ and $H_2$ of the magnetizing force. To these values correspond then the flux densities $I_1$ and $I_2$ stated on the ordinates. According to the present invention neither the value $I_1$ nor the value $I_2$ forms the basis for the determination of the percentage of carbon, but the difference between these two values.

The object of the repeated magnetizations and demagnetizations is also shown in Figure 1 on an enlarged scale. The highest possible flux density corresponding to the magnetic force H, is not obtained on the demagnetization following the first magnetization. The highest possible flux density is obtained only after the specimen has been magnetized and demagnetized several times. The zigzag line of the diagram is intended to show this progress. The curves approach gradually an ultimate position. When this position has been reached it can be said that the flux density of the specimen consists of two portions: a fixed value $I_1$ and a "loose" value $I_2-I_1$ which latter fluctuates with the magnetizing and the demagnetizing force between the two magnetizing values $H_1$ and $H_2$. As before stated, experiments have confirmed the fact that it is this "loose" value or the "magnetic loss" in demagnetizing from the field value $H_2$ to the value $H_1$ which can be used as a direct indication of the percentage of carbon.

It has also been found that it is advantageous with regard to accuracy and rapidity in making the test that the specimen have pronounced remanent properties. In order to obtain such properties the specimen should be hardened by heating it for a sufficient period at a sufficiently high temperature and then rapidly cooling it.

In practice the "magnetic loss" between two values of the magnetizing force should be measured by means of a suitable instrument. The constant of the apparatus is determined empirically by measuring the percentage of carbon of a standard specimen. The percentage of carbon can then be read either from a curve or a table or on the scale of the instrument, empirically graduated.

The measurement of the "magnetic loss" can of course be made in various ways, for instance by means of a magnetometer or by the ballistic method. The latter method is preferred for practical reasons as the influence of external magnetic fields then can be avoided, for instance by the use of a moving coil instrument with a tightly closed magnetic circuit.

According to the present method it is possible to measure the percentage of carbon of an iron specimen rapidly and exactly without working the specimen and independent of any external magnetic fields and iron objects. A quantity of the melting iron may consequently be taken out of the furnace for making the specimen. This method enables the decarbonization to be followed and stopped when the percentage of carbon required has been obtained.

There are, as is known, several instruments for measuring the difference of the magnetic flux of certain iron specimens. However, it is not possible to use any one of these instruments directly for determining the percentage of carbon according to the above described method. Many incidental circumstances disturb and make it impossible to obtain exactly the same results, for instance for the same specimen in the same apparatus but on different occasions. Only after eliminating or reducing such circumstances to a minimum does the above measuring method become suitable for technical purposes. The construction of the magnetic measuring instruments is therefore an indispensable complement to the method according to the invention.

As hereinbefore stated, it is necessary that the measuring of $I_2-I_1$ may be done rapidly and reliably. The ballistic method must in this regard be considered the best one. The instruments usually used in connection with the method, in which the specimen is inserted in a primary induction coil in which the current flows and an outer secondary coil connected to the ballistic galvanometer, cannot be used partly because the magnetic leakage cannot then be kept constant for the same specimen, neither with closed nor with open magnetic circuits, and partly because the heat produced by the primary current causes changes of temperature which alters the resistance of the secondary coil, and also that of the iron. In the present invention these disturbing factors have been eliminated partly by arranging magnetic screens at the two ends of the iron specimen and the secondary coil and partly by making the magnetizing and demagnetizing in an external magnetic circuit relative to the screens either by means of a coil conducting current, or still better, by means of a permanent magnet. By placing the current coil apart from the specimen, or in a still higher degree by using permanent magnets, the heating disturbances of the primary current may be eliminated. However, in order to obtain constancy also the variations in the magnetizing forces must be compensated. The whole arrangement will, however, be useless if a certain specimen does not give a certain indication. If the magnetization is effected by means of the primary current coil, the current in the secondary coil may be adjusted until the indication determined for a constant standard specimen is obtained. This adjustment is, however, troublesome. The sources of the current are very frequently not constant. A preliminary adjustment must therefore be made by the aid of an ammeter and thereafter an accurate adjustment by the aid of a standard. But what is worse, a correcting adjustment must be made during the operation of the instrument on account of the heat generated in the primary coil, which thus alters the resistance and consequently also the magnetizing current. The more indications made by the instrument the warmer grows the primary coil and the weaker the magnetizing current. This correction must therefore be made frequently and is time consuming, and not fully satisfactory.

As the constancy of the instrument is, as said before, of very great importance, the circuit of the magnet as well as that of the specimen must be protected against disturbing magnetic fields, which is done by enclosing the apparatus in an iron box. The magnetic leakage is thus rendered constant in each separate case and changes of the intensity of the magnetic field due to outside influences prevented.

In the above description of the method it may be pointed out that the curves of magnetization and demagnetization gradually approach their ultimate position. This position is theoretically reached only after an infinite number of magnetizings, but in practice only a few such magnetizations are required. It is, however, necessary to keep the error, which arises when the magnetizations and demagnetizations are stopped too soon, so small that it does not impair the accuracy of the method. It is therefore always necessary to make preliminary magnetizings in sufficient number before the "loss" is measured. The apparatus must therefore be so constructed that this measurement cannot be made unless a certain stated number of magnetizations and demagnetizations have been made. The technical "carbometer" must therefore include a device which automatically makes these preliminary magnetizations. This is preferably carried out by means of a clockwork.

Figure 4:
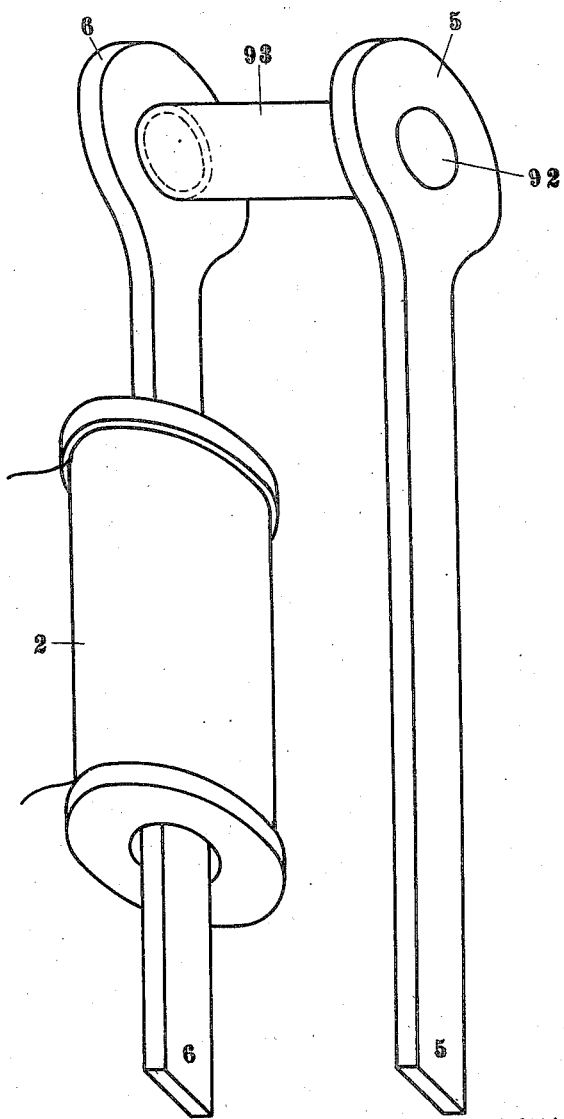
Fig. 4 is a detail perspective view showing a modified disposition of the magnetic coil.

"Carbometers" constructed according to the above described invention are shown in Figures 2 to 4.

Figure 2 represents schematically the complete apparatus, and Figure 3 is a detailed view thereof. The apparatus shown in these illustrations consists of a coil wound with many turns of insulated copper wire 3, a ballistic galvanometer 4 of suitable sensibility and damping, and a device for magnetizing and demagnetizing the specimen 1 (Fig. 3) between the two magnetizing values chosen for the apparatus.

When the magnetization and the demagnetization is made, in the manner hereinafter described, the coil 2 with the winding 3, in which the specimen is placed, must be furnished with magnetic screens 5 and 6 of soft iron (see Figure 3) in order to obtain constant leakage. The specimen should be cast in a tilted mould in order to avoid air-bubbles. For the same reason the specimen must have rather a large head 7 (Fig. 3). When the specimen, hardened as above described, is placed in the coil, it forms an essential part of a magnetic circuit the remaining magnetic resistance is constant. For the purpose of preventing the head of a specimen, which head may have various shapes and sizes from exerting any influence upon the magnetic flux in the circuit, the screens 5 and 6 are inserted. These screens are arranged at such a distance from each other (or the specimen is of such a length) that the cylindrical part of the specimen magnetically connects the plates 5 and 6, while the head 7 is completely outside the one plate.

The ballistic galvanometer 4 is of usual moving coil type and suitably furnished with a lens movable over the scale for accurate reading of the momentary indication, corresponding to the "magnetic loss" of the chosen difference in magnetizing forces.

The magnetization and demagnetization may be carried out in different ways.

If an electric current varied between two values is used for this purpose, the apparatus may be constructed as shown in Figure 2. The ends of the magnetic screens 5 and 6 of soft iron, which border the coil 2 in which the specimen is inserted, are connected to a core 8, also made of soft iron, fixed between the ends of the screens. The magnetic circuit is then composed of the specimen, the screen 5, the iron core 8 and the screen 6. This circuit is now magnetized by sending an electric current from, for instance a storage battery, through the wire 9—10 wound on the iron core 8 or on any other portion of the magnetic circuit. The electric current circuit includes, besides the battery 11 and the wire 9—10, an adjustable rheostat 12, the contact spring 15 and the contact lever 14. On the shaft 18, driven by a clockwork, is fixed a pinion 16. When the clockwork shaft is started and the pinion rotates, the end 17 of the lever 14 is moved upward by the teeth of the pinion 16, making contact between the lever 14 and the spring 15 by means of the contact 19, once by each tooth of the pinion 16, which passes the end 17 of the lever 14. The current from the battery 11 is thus closed and broken also once for each tooth of the said pinion 16. When the contact 19 is shunted by means of the adjustable rheostat 13, the current may also be varied between two certain values determined with the rheostats 12 and 13 instead of being closed and broken. A specimen 1, inserted in the coil 2 is thus magnetized and demagnetized between two definite magnetomotive forces generated by the coil 9—10 in the magnetic circuit (specimen-pieces 5—8—6) once for each tooth of the pinion 16. As above pointed out, the indication of the "magnetic loss" in the specimen should be read off from the ballistic galvanometer 4 only after a sufficient number of magnetizations and demagnetizations have been made. Only in this way is the loss rendered practically constant, as hereinbefore stated, so that the percentage of carbon of the specimen can be determined by measuring the amount of the loss. The galvanometer must not be connected during these preliminary magnetizations, as it would not then be still when the definite reading is to be made. The galvanometer may be connected for instance in the manner shown in Figure 2. The circuit from the coil 2 is closed over the outer terminal 29 of the galvanometer 4, over the outer terminal 30 to the lever 21 and, when the end 25 of this lever is moved upward to the contact spring 22 and from this spring back to the coil 2. During the preliminary magnetizations the end 24 is not raised, the circuit of the galvanometer is thus broken at the contact pin 28. In order to keep the galvanometer still damped it is shunted by means of a suitable resistance 31 over the contact lever 21 and the lower spring 23 by the aid of a pin 27. The lever 21 is raised by the tooth 26 of the cam 25. This is effected only when the definite indication is to be made. The cam 25 is for this purpose fixed on the same shaft 18 as the pinion 16. The clockwork and this shaft 18 are released by pressing a button 44, which acts upon a stopping lever 35 fitted with a catch 36. The catch 36 engages the teeth of the cam 32, also fixed on the shaft 18. As will be seen, this cam 32 has only two teeth 33 and 34. In the original position, (not that shown in the Figure 2), the tooth 34 rests against the catch 36 of the lever 35. The end is then lying behind the tooth 26 and the end of the catch 17, between the teeth 46 and 47. After the iron specimen has been inserted in its place in the coil 2, the button 44 is pressed once. The lever 42 which moves on the shaft 43 is thereby raised at the end 41, where it bears the shaft 49 on which the lever 38 is fixed. The spring 40 holds the lever 38 pressed against the support 39 attached to the arm 42. The fore end of the lever 38 thus moves upwardly and raises the end 37 of the lever 35 but only for a moment sufficient to raise the catch 36 over the tooth 34. When the end 37 has been raised somewhat, the end of the lever 38 slides off the end 37 when the lever 35 and the catch 36 again fall down on the cam 32. As no tooth now holds the catch 36 the clockwork rotates and the catch 17 is moved up and down once for each tooth of the pinion 16 effecting the preliminary magnetizations, as previously described. After a certain number (in this case 15) of these magnetizations have been made, the clockwork is stopped by the catch 36 on striking the tooth 33 of the cam 32. The cams then come into the positions shown in the figure.

While the cams are rotating, or after they have been stopped, the button 44 should be released. On releasing this button the lever 38 is pulled back striking the end 37, so that the lever 38 again slides down below the end 37 and returns to the original position. For reading the indication of the galvanometer 4 the button 44 is now pressed once more. The end 37 is then again raised so that the catch 36 releases the tooth 33 but falls down immediately when the lever 38 passes the end 37, as previously described. On the second pressing of the button 44 the clockwork turns the shaft 18 only part of the way corresponding to the distance between the teeth 33 and 34 of the cam 32. By this turning the tooth 46 operates the lever 14 once and the tooth 26 operates the lever 21. These teeth 46 and 26 are of such a shape and so located and the contact springs 15 and 22 so placed that the tooth 46 first raises the catch 17 so that the lever 14 on the spring 15 comes into contact by means of the contact 19. The catch 24 of the lever 21 is then immediately raised by the tooth 26, so that the lever 21 and the spring 22 come into contact by the aid of the contact 28. The catch 17 then falls back from the tooth 46 so that interruption is made at the contact 19, the reading of the galvanometer 4 then taking place. The catch 24 now falls down from the tooth 26, breaking the current at the pin 28, but closing it at the contact 27. This closing must take place immediately before the pointer of the galvanometer returns from the indication back to zero. The resistance 31 is in this case so regulated that the motion of the moving coil of the galvanometer is damped or stopped and compels the pointer to stop on zero or close to it. The moment for releasing the button 44 has obviously nothing to do with this damping. However, after the button has been released the lever 38 returns to its original position below the end 37, as before described. By means of such a device, which, of course, may be made in many various ways, any chance of omitting the preliminary magnetizations is prevented, at the same time as it ensures the same number of magnetizations always being made.

If the magnetomotive force of the coil 9—10 is not varied between a certain value and zero, that is, if the primary current is not closed or broken but is varied between two values, that is, if the rheostat 13 is connected in shunt to the contact 19, the rheostat 13 should first be adjusted, so that an ammeter 50 inserted in the shunt, indicates a predetermined value, whereupon the adjustment of the rheostat 12 is made by the aid of a standard, as above described.

However, independently of the method used for magnetizing and demagnetizing of the specimen, that is, for closing and breaking a magnetic field flowing through the screens 5 and 6 to the specimen, the coil 2 in which the loss is induced may be placed on any part of the magnetic circuit. For instance, it may be placed on the screen 6, as shown in Fig. 4. Between the free ends of the screens 5 and 6 a magnetic flux may, as above described, be introduced or cut off by means of a coil carrying a current which is varied or by means of a permanent magnet, the position of which is changed or the magnetic circuit of which is broken and closed or shunted and opened. The magnetic field is conducted to the specimen by means of the screens 5 and 6, the specimen being inserted in the opening 92 of the pipe 93 which is made of non-magnetic material. The change of the field on magnetizing and demagnetizing the specimen takes place not only in the specimen itself but also in the screens or the pieces 5 and 6. In view of the magnetic leakage always present the coil 2 should for convenience be placed outside the pipe 93 in the way shown in Figures 2—4.

Having now particularly described the nature of our invention and the manner of its operation, what we claim is:

1. The method of determining the percentage of carbon in a specimen of iron or steel which consists in subjecting the specimen to repeated magnetization and demagnetization between two chosen values of the magnetizing force, and measuring the difference between the magnetic fluxes through the specimen at said two values.

2. The method of determining the percentage of carbon in a specimen of iron or steel which consists in hardening the specimen, subjecting the same repeatedly to magnetization and demagnetization between two chosen values of the magnetizing force, and measuring the difference between the magnetic fluxes through the specimen at said two values.

3. Apparatus for determining the percentage of carbon in a specimen of iron or steel, comprising a magnetic circuit including the specimen to be tested, an induction coil wound upon a portion of said circuit, a magnetizing coil placed on a different portion of said circuit, means for repeatedly varying the magnetizing forces between two chosen values, and means for measuring the difference between the magnetic fluxes through the specimen at said two values.

4. Apparatus for determining the percentage of carbon in a specimen of iron or steel, comprising a magnetic circuit including the specimen to be tested, an induction coil wound upon said specimen, a magetizing coil placed on a different portion of said circuit, means for repeatedly varying the magnetizing forces between two chosen values, and means for measuring the difference between the magnetic fluxes through the specimen at said two values.

5. Apparatus for determining the percentage of carbon in a specimen of iron or steel, comprising a magnetic circuit including the specimen to be tested, an induction coil wound upon a portion of said circuit, and a magnetizing coil placed on a different portion of said circuit, magnetic screens for preventing specimens of different lengths from exerting any influence upon the result and insuring that the same length of specimen is included in the magnetic circuit when the determination is being made.

6. Apparatus for determining the percentage of carbon in a specimen of iron or steel, comprising a magnetic circuit including the specimen to be tested, an induction coil wound upon a portion of said circuit, a magnetizing coil placed on a different portion of said circuit, and an iron box enclosing said circuit for eliminating disturbance due to external magnetic fields and ensuring constant leakage from the circuit.

7. Apparatus for determining the percentage of carbon in a specimen of iron or steel, comprising a magnetic circuit including the specimen to be tested, an induction coil wound upon a portion of said circuit, a magnetizing coil placed on a different portion of said circuit, and mechanism for controlling the opening and closing of the current in the magnetizing coil.

8. Apparatus for determining the percentage of carbon in a specimen of iron or steel, comprising a magnetic circuit including the specimen to be tested, an induction coil wound upon a portion of said circuit, a magnetizing coil placed on a different portion of said circuit, and automatically operative mechanism for opening and closing the current in the magnetizing coil for repeatedly magnetizing and demagnetizing the specimen.

9. Apparatus for determining the percentage of carbon in a specimen of iron or steel, comprising a magnetic circuit including the specimen to be tested, an induction coil wound upon a portion of said circuit, a magnetizing coil placed on a different portion of said circuit, a measuring instrument adapted to be placed in circuit with said induction coil, and means for maintaining the induction coil, and measuring instrument out of electrical connection during a predetermined time and automatically operative to connect said measuring instrument and induction coil after said predetermined time.

In testimony whereof we have signed our names to this specification.

CARL JOHAN GUNNAR MALMBERG.
JOHAN GUNNAR HOLMSTRÖM.